(12) United States Patent
Lovitt et al.

(10) Patent No.: US 12,641,368 B2
(45) Date of Patent: *May 26, 2026

(54) CONTACT AND ACOUSTIC MICROPHONES FOR VOICE WAKE AND VOICE PROCESSING FOR AR/VR APPLICATIONS

(71) Applicant: Meta Platforms Technologies, LLC, Menlo Park, CA (US)

(72) Inventors: Andrew Lovitt, Redmond, WA (US); Taher Shahbazi Mirzahasanloo, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/773,411

(22) Filed: Jul. 15, 2024

(65) Prior Publication Data

US 2024/0373162 A1 Nov. 7, 2024

Related U.S. Application Data

(63) Continuation of application No. 17/824,321, filed on May 25, 2022, now Pat. No. 12,041,427.
(Continued)

(51) Int. Cl.
| | |
|---|---|
| *H04R 5/00* | (2006.01) |
| *G10L 15/26* | (2006.01) |

(Continued)

(52) U.S. Cl.
CPC .............. *H04R 3/005* (2013.01); *G10L 15/26* (2013.01); *G10L 25/78* (2013.01); *H04R 5/033* (2013.01);
(Continued)

(58) Field of Classification Search
CPC .... H04R 3/005; H04R 5/033; H04R 2420/07; G10L 15/26; G10L 25/78; G10L 2025/783
(Continued)

(56) References Cited

U.S. PATENT DOCUMENTS 10,841,693 B1 11/2020 Ganeshkumar et al.
2012/0278070 A1* 11/2012 Herve ................. G10L 21/0208
704/226
(Continued)

FOREIGN PATENT DOCUMENTS

| EP | 2824663 A2 | 1/2015 |
|---|---|---|
| EP | 3343348 A1 | 7/2018 |
| WO | 2020079485 A2 | 4/2020 |

OTHER PUBLICATIONS

Office Action mailed Apr. 16, 2025 for European Application No. 22768514.6, filed Aug. 14, 2022, 8 pages.
(Continued)

*Primary Examiner* — Ammar T Hamid
(74) *Attorney, Agent, or Firm* — Greenberg Traurig, LLP

(57) ABSTRACT

A method to combine contact and acoustic microphones in a headset for voice wake and voice processing in immersive reality applications is provided. The method includes receiving, from a contact microphone, a first acoustic signal, determining a fidelity and a quality of the first acoustic signal, receiving, from an acoustic microphone, a second acoustic signal, and when the fidelity and quality of the first acoustic signal exceeds a pre-selected threshold, combining the first acoustic signal and the second acoustic signal to provide an enhanced acoustic signal to a smart glass user. A non-transitory, computer-readable medium storing instructions to cause a headset to perform the above method, and the headset, are also provided.

20 Claims, 7 Drawing Sheets

Related U.S. Application Data

(60) Provisional application No. 63/297,588, filed on Jan. 7, 2022, provisional application No. 63/233,143, filed on Aug. 13, 2021.

(51) Int. Cl.

| | |
|---|---|
| *G10L 25/78* | (2013.01) |
| *H04R 3/00* | (2006.01) |
| *H04R 5/033* | (2006.01) |
| *G10K 11/16* | (2006.01) |

(52) U.S. Cl.
CPC .... *G10L 2025/783* (2013.01); *H04R 2420/07* (2013.01)

(58) Field of Classification Search
USPC .................................................... 381/26, 71.2
See application file for complete search history.

(56) References Cited

U.S. PATENT DOCUMENTS

| | | |
|---|---|---|
| 2016/0205488 A1 | 7/2016 | Gomez |
| 2016/0299738 A1 | 10/2016 | Mäkinen et al. |
| 2017/0098453 A1 | 4/2017 | Wright et al. |
| 2017/0295446 A1 | 10/2017 | Thagadur Shivappa |
| 2018/0217806 A1 | 8/2018 | Jang |
| 2018/0341455 A1 | 11/2018 | Ivanov et al. |
| 2018/0349088 A1 | 12/2018 | Leppänen et al. |
| 2019/0139312 A1 | 5/2019 | Leppänen et al. |
| 2019/0187779 A1 | 6/2019 | Miller |
| 2019/0320282 A1 | 10/2019 | Moeller |
| 2019/0342693 A1 | 11/2019 | Norris et al. |
| 2020/0059717 A1 | 2/2020 | Chang et al. |
| 2020/0310748 A1 | 10/2020 | Huang |
| 2021/0043167 A1 | 2/2021 | Cartier et al. |
| 2021/0092232 A1 | 3/2021 | Norris et al. |
| 2021/0092514 A1 | 3/2021 | Agarwala et al. |
| 2021/0104222 A1 | 4/2021 | Laroche et al. |
| 2021/0173614 A1 | 6/2021 | Shin et al. |
| 2021/0235207 A1 | 7/2021 | Wexler et al. |
| 2021/0295849 A1 | 9/2021 | Van Der Ven et al. |
| 2022/0217490 A1 | 7/2022 | Lyren et al. |
| 2022/0238091 A1 | 7/2022 | Jasleen et al. |
| 2022/0417687 A1 | 12/2022 | Lyren et al. |

OTHER PUBLICATIONS

Office Action mailed Feb. 21, 2025 for European Patent Application No. 22765659.2, filed on Aug. 14, 2022, 15 pages.

International Preliminary Report on Patentability for International Application No. PCT/US2022/040277, mailed Feb. 22, 2024, 9 pages.

International Preliminary Report on Patentability for International Application No. PCT/US2022/040281, mailed Feb. 22, 2024, 12 pages.

International Preliminary Report on Patentability for International Application No. PCT/US2022/040283, mailed Feb. 22, 2024, 16 pages.

International Search report and Written Opinion for International Application No. PCT/US2022/040277, mailed Dec. 2, 2022, 11 pages.

International Search report and Written Opinion for International Application No. PCT/US2022/040281, mailed Nov. 22, 2022, 14 pages.

International Search Report and Written Opinion for International Application No. PCT/US2022/040283, mailed Jan. 30, 2023, 20 pages.

Invitation to Pay Additional Fees for International Application No. PCT/US2022/040283, mailed Dec. 7, 2022, 14 pages.

Office Action mailed on Dec. 7, 2023 for related U.S. Appl. No. 17/824,321, pp. 14 pgs.

Shang J., et al., "Enabling Secure Voice Input on Augmented Reality Headsets using Internal Body Voice," 16th Annual IEEE International Conference on Sensing, Communication, and Networking (SECON), 2019, pp. 1-9.

Turan M.A. T., et al., "Source and Filter Estimation for Throat-Microphone Speech Enhancement," IEEE/ACM Transactions on Audio, Speech, and Language Processing, vol. 24, No. 2, Feb. 2016, pp. 265-275.

USPTO—Office Action mailed on May 6, 2024 in related U.S. Appl. No. 17/833,631, 7 pages.

* cited by examiner

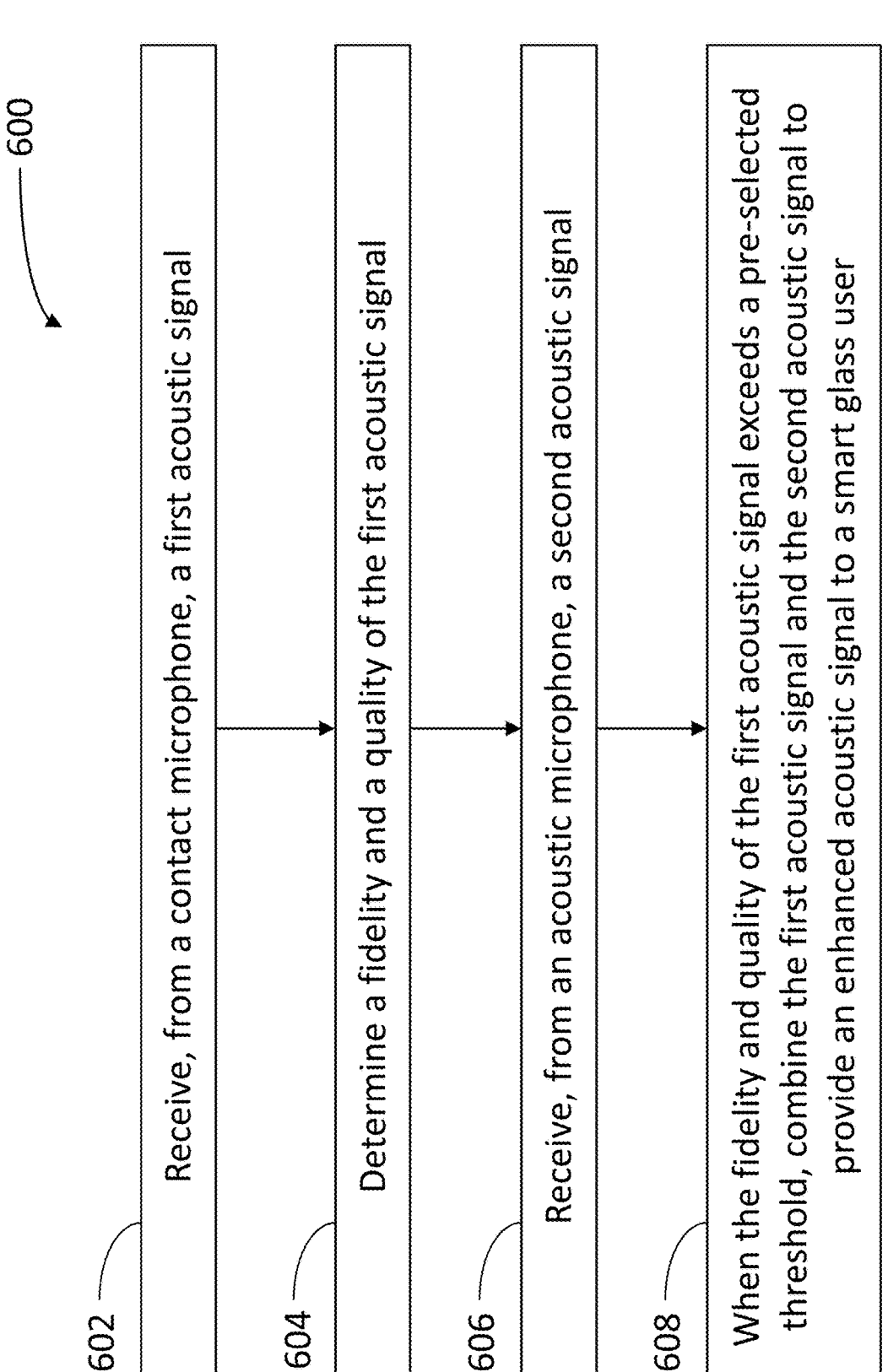

600

602 Receive, from a contact microphone, a first acoustic signal

604 Determine a fidelity and a quality of the first acoustic signal

606 Receive, from an acoustic microphone, a second acoustic signal

608 When the fidelity and quality of the first acoustic signal exceeds a pre-selected threshold, combine the first acoustic signal and the second acoustic signal to provide an enhanced acoustic signal to a smart glass user

FIG. 6

CONTACT AND ACOUSTIC MICROPHONES FOR VOICE WAKE AND VOICE PROCESSING FOR AR/VR APPLICATIONS

CROSS-REFERENCE TO RELATED APPLICATIONS

This present application claims the benefit of priority under 35 U.S.C. § 120 as a continuation of U.S. patent application Ser. No. 17/824,321, filed May 25, 2022, now allowed, which claims the benefit of priority under 35 U.S.C. § 119(e) to U.S. Provisional Pat. Appln. No. 63/233,143 entitled AUDIO HARDWARE AND SOFTWARE FOR SMART GLASSES, filed on Aug. 13, 2021, and to U.S. Provisional Pat. Appln. No. 63/297,588 entitled CONTACT AND ACOUSTIC MICROPHONES FOR VOICE WAKE AND VOICE PROCESSING FOR AR/VR APPLICA-TIONS, filed on Jan. 7, 2022, both to Andrew LOVITT et al., the contents of which applications are hereinafter incor-porated by reference, in their entirety, for all purposes.

BACKGROUND

Field

The present disclosure is directed to microphones in wearable headsets. More specifically, embodiments as dis-closed herein are directed to contact and acoustic micro-phones for smart glasses for use in immersive reality envi-ronments.

Related Art

In the field of wearable devices, many applications include microphones to record sound coming from the environment or the user. However, in many instances these microphones are acoustic devices open to the air, prone to pick up all sorts of environmental noise and interferences that are often times omnidirectional and have a wide band-width, being therefore difficult to eliminate by common filters and other hardware/software applications.

BRIEF DESCRIPTION OF THE DRAWINGS

FIG. 6 is a flowchart illustrating steps in a method for playing, in an immersive reality application, a recording of an event made with a smart glass, according to some embodiments.

In the figures, elements and procedures having the same or similar reference elements have the same or similar attributes and description, unless explicitly stated otherwise.

SUMMARY

Figure 1:
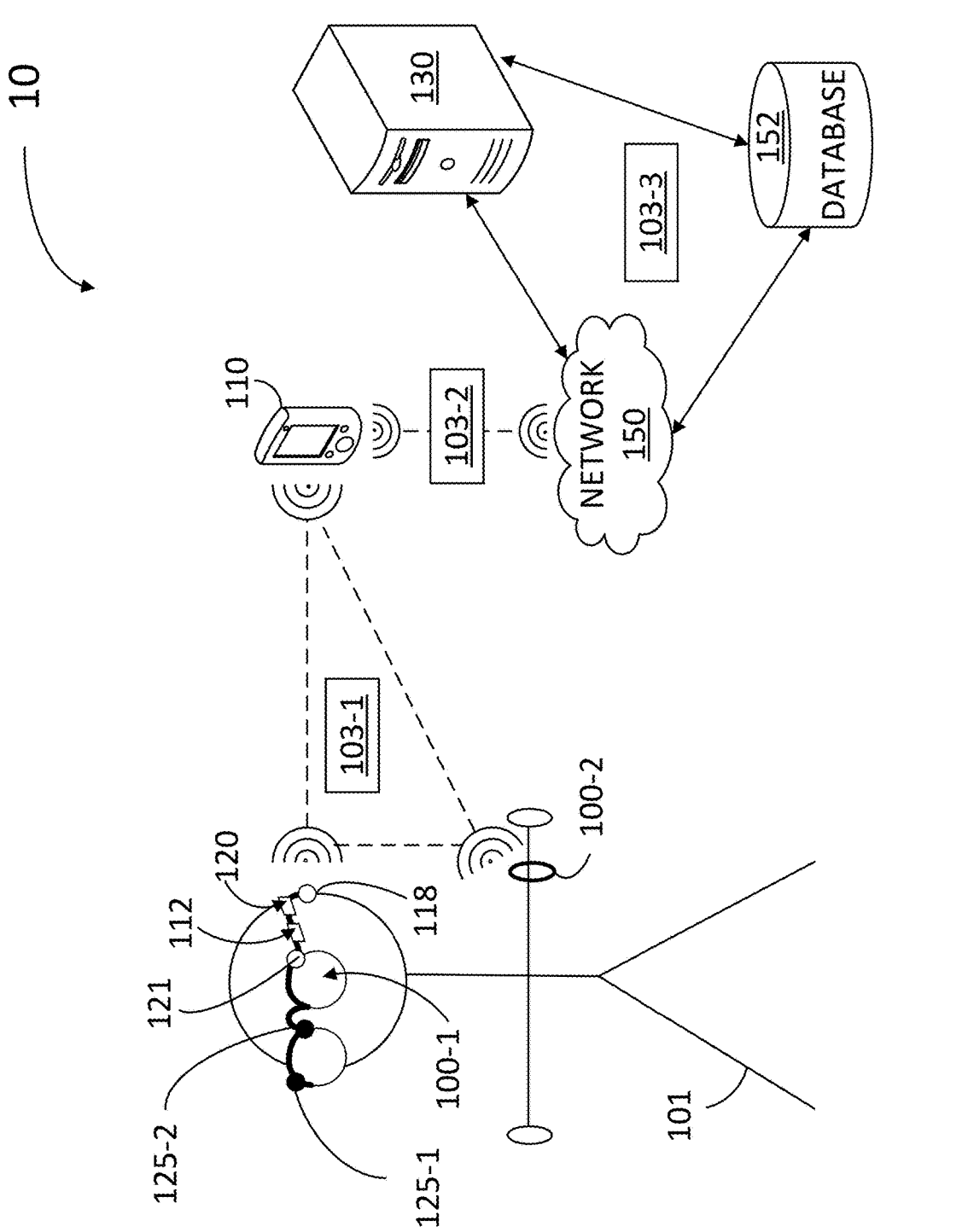
FIG. 1 illustrates an architecture including one or more wearable devices coupled to one another, to a mobile device, a remote server and to a database, according to some embodiments.

In a first embodiment, a computer-implemented method includes receiving, from a contact microphone, a first acous-tic signal, determining a fidelity and a quality of the first acoustic signal, receiving, from an acoustic microphone, a second acoustic signal, and when the fidelity and quality of the first acoustic signal exceeds a pre-selected threshold, combining the first acoustic signal and the second acoustic signal to provide an enhanced acoustic signal to a user of an augmented reality headset.

In a second embodiment, a headset includes a contact microphone configured to provide a first acoustic signal, an acoustic microphone configured to receive a second acoustic signal, a processor configured to determine a fidelity and a quality of the first acoustic signal, and a combination com-ponent configured to combine the first acoustic signal with the second acoustic signal to provide an enhanced acoustic signal to a user of the headset.

In a third embodiment, a system includes a memory storing instructions and one or more processors configured to execute the instructions and cause the system to perform a method. The method includes receiving, from a contact microphone, a first acoustic signal, determining a fidelity and a quality of the first acoustic signal, receiving, from an acoustic microphone, a second acoustic signal, and when the fidelity and quality of the first acoustic signal exceeds a pre-selected threshold, combining the first acoustic signal and the second acoustic signal to provide an enhanced acoustic signal to a user of an augmented reality headset.

In yet other embodiments, a system includes a first means to store instructions and a second means to execute the instructions to cause the system to perform a method. The method includes receiving, from a contact microphone, a first acoustic signal, determining a fidelity and a quality of the first acoustic signal, receiving, from an acoustic micro-phone, a second acoustic signal, and when the fidelity and quality of the first acoustic signal exceeds a pre-selected threshold, combining the first acoustic signal and the second acoustic signal to provide an enhanced acoustic signal to a user of an augmented reality headset.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and tech-niques have not been shown in detail so as not to obscure the disclosure.

Audio is a primary interaction modality for enhanced reality applications, including virtual reality (VR) and aug-mented reality (AR). Spatially identified and selected audio signals can be used to generate audio filters, giving users access to novel audio experiences. Accordingly, this allows better and more immersive user content creation.

Wearable devices typically include one or more acoustic microphones and software to capture and process acoustic signals. Great advancement has been achieved in using hardware and software filters (including machine learning algorithms) for noise cancelation, background reduction, and to remove environmental interference. However, acoustic microphones, opened to the air, receive wide bandwidth of sound perturbations, no less from simple air flow into the microphone, causing minuscule pressure fluctuations that feed into the signal of sensitive microphones. It is typically challenging to remove these noise interferences when they are common, to a greater or lesser degree, to virtually all acoustic microphones.

To resolve the above challenge, smart glasses as disclosed herein include one or more contact microphones and one or more acoustic microphones to provide a combined acoustic signal, enhanced with highly suppressed noise and environmental interferences.

FIG. 1 illustrates an architecture 10 including one or more wearable devices 100-1 and 100-2 (hereinafter, collectively referred to as "wearable devices 100") coupled to one another, to a mobile device 110, a remote server 130 and to a database 152, according to some embodiments. Wearable devices 100 may include a smart glass 100-1 and a wristband 100-2 (or "watch"), and the mobile device may be a smart phone, all of which may communicate with one another via wireless communications and exchange a first dataset 103-1. Dataset 103-1 may include a recorded video, audio, or some other file or streaming media. A user 101 of wearable devices 100 is also the owner or is associated with mobile device 110. In some embodiments, at least one of wearable devices 100 (e.g., smart glass 100-1) may directly communicate with remote server 130, database 152, or any other client device (e.g., a smart phone of a different user, and the like) via a network 150.

Mobile device 110 may be communicatively coupled with remote server 130 and database 152 via network 150, and transmit/share information, files, and the like with one another (e.g., dataset 103-2 and dataset 103-3).

In some embodiments, smart glass 100-1 may include multiple sensors 121 such as inertial measurement units (IMUs), gyroscopes, microphones, cameras, and the like mounted within the frame of smart glass 100-1 or wristwatch 100-2 or wrist-band. Other sensors 121 that can be included in the wearable devices 100 may be magnetometers, photodiodes and cameras, touch sensors, and other electromagnetic devices such as capacitive sensors, a pressure sensor, and the like. Smart glass 100-1 may include an acoustic microphone 125-1 and a contact microphone 125-2 (hereinafter, collectively referred to as "microphones 125"). Acoustic microphone 125-1 receives acoustic signals propagating through the air, as pressure waves. Contact microphone 125-2 may be mechanically coupled to the skin and a bone of the user, e.g., in a nose pad or in an arm of smart glass 100-1, in contact with the user's temple, and the like.

In addition, smart glass 100-1, and any other wearable device 100, or mobile device 110 may include a memory circuit 120 storing instructions, and a processor circuit 112 configured to execute the instructions to cause smart glass 100-1 to perform, at least partially, some of the steps in methods consistent with the present disclosure. In some embodiments, smart glass 100-1, wrist-watch 100-2, wristband, or wearable device 100, mobile device 110, server 130 and/or database 152 may further include a communications module 118 enabling the device to wirelessly communicate with one another via network 150. In some embodiments, communications module 118 can include, for example, radio-frequency hardware (e.g., antennas, filters analog to digital converters, and the like) and software (e.g., signal processing software). Smart glass 100-1 may thus download a multimedia online content (e.g., dataset 103-1) from remote server 130, to perform at least partially some of the operations in methods as disclosed herein. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

In some embodiments, acoustic microphone 125-1 is configured to receive a first acoustic signal and contact microphone 125-2 is configured to provide a second acoustic signal. The processor may be configured to determine a fidelity and a quality of the second acoustic signal. The smart phone may also include a combination component configured to combine the first acoustic signal with the second acoustic signal to provide an enhanced signal to user 101. Further, memory circuit 120 may store instructions which, when executed by processor 112, cause the combination component to identify a background interference in the first acoustic signal based on a lack thereof in the second acoustic signal, and to remove the background interference from the enhanced acoustic signal. In some embodiments, memory circuit 120 may store instructions which, when executed by processor 112, cause the combination components to remove a background interference from the enhanced acoustic signal with a machine learning algorithm fed with the first acoustic signal and the second acoustic signal. In some embodiments, memory circuit 120 stores instructions which, when executed by processor 112, cause the combination component to feed a waveform pattern including the first acoustic signal through a machine learning algorithm to identify a background interference. In some embodiments, memory circuit 120 stores instructions which, when executed by processor 112, cause the combination component to receive a signal from an inertial motion sensor, and to identify the signal as a background interference in the second acoustic signal.

Figure 2:
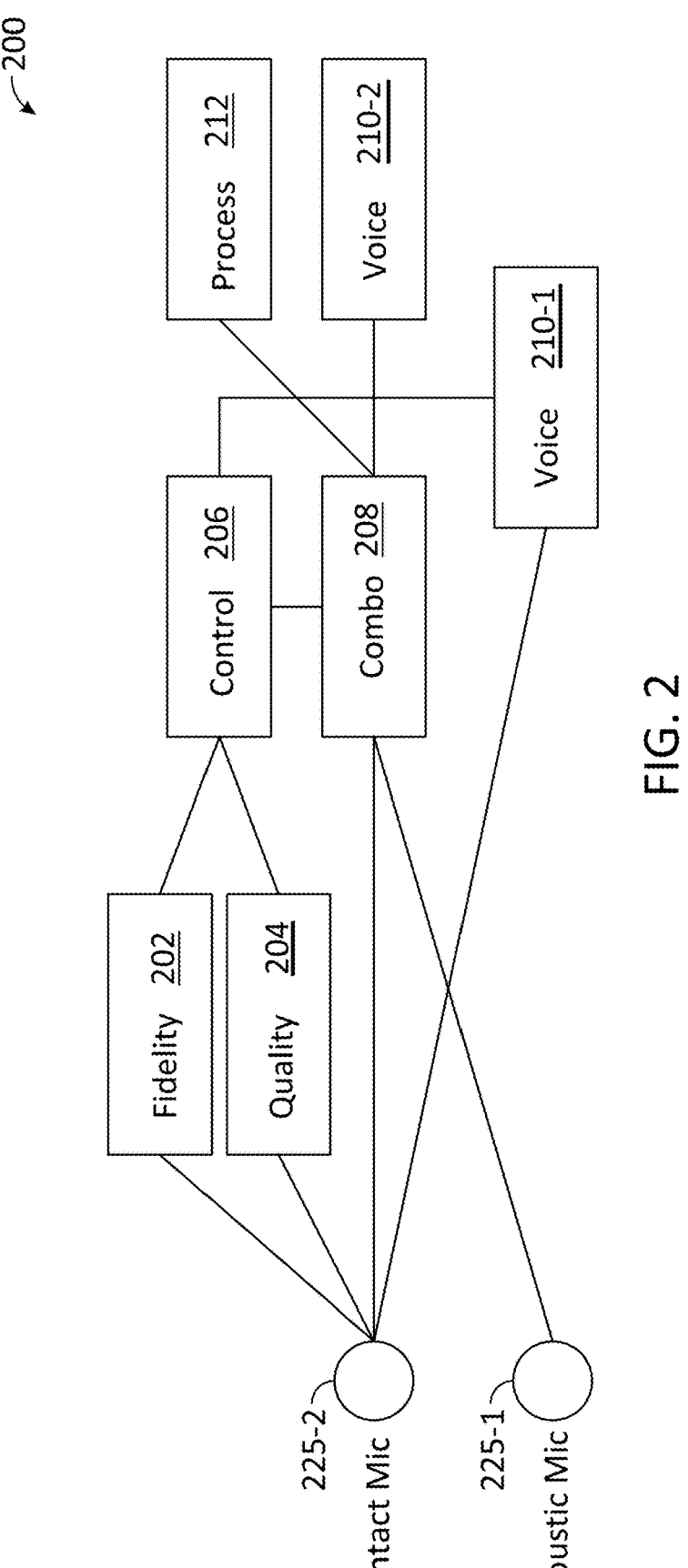
FIG. 2 illustrates features of audio processing for contact microphones and acoustic microphones, according to some embodiments.

FIG. 2 illustrates some of the features of an audio process 200 including acoustic microphones 225-1 and contact microphones 225-2, according to some embodiments. In some embodiments, the system includes one or more acoustic microphones 225-1 and a contact microphone 225-2. In highly noisy environments, acoustic microphones 225-1 pick up both the user's voice and the environmental noise, which may corrupt the signal and become a challenge for speech processing. Accordingly, a contact microphone 225-2 that rests on the user's skin and picks up the vibrations therefrom (especially close to bone or cartilage, e.g., on the frame of a smart glass near the nose or temples), may provide an environment noise-free signal that can be used to remove environmental noise from acoustic microphones 225-1. In general, the information received by contact microphone 225-2 contains significantly less wind, and other airborne corrupting noises and interferences (e.g., including talking and conversations from other people in the environment of a smart glass user).

Some of the features of a system as disclosed herein include the ability to use contact microphone 225-2 to determine whether the smart glass user is talking relative to the background, and the ability to tune a contact microphone algorithm (e.g., with the processor circuit, storing updated versions in the memory circuit) based on the acoustics in the room over time. Additionally, process 200 provides the ability to use the signal from contact microphone 225-2 to tune a fidelity analysis 202 of contact microphones 225-2. In addition, some embodiments include the ability to use contact microphone 225-2 to inform the usage or non-usage of the signal, the ability to fuse contact microphone information with acoustic microphones 225-1 to provide a cleaner signal, and the ability to use the contact microphone information on a frequency selective basis. Moreover, some embodiments provide the ability to use contact microphone 225-2 to adjust process 200 over time based on fidelity analysis 202, and the ability to drive a voice activity detection 210-1, which may be in low power mode given the sensitivity of contact microphone 225-2 to acoustic waves generated by the user of the smart glass.

In some embodiments, contact microphone 225-2 may be on the nose of the user (e.g., on one or both of the nose pads of the smart glasses) and may also be integrated into the eyepieces. It should be appreciated that contact microphone 225-2 can be positioned in multiple places on the smart glasses. In some embodiments, devices such as sensors, transducers, and processors to operate any of the blocks in process 200 could be mounted on the smart glasses or in a remote server communicatively coupled with the smart glasses via a network (e.g., smart glass 100-1, server 130, and network 150).

In some embodiments, the signal from a contact microphone is subjected to a quality analysis 204 to determine its applicability. In some embodiments, fidelity analysis 202 and quality analysis 204 perform two functions: to determine whether the information from contact microphone 225-2 is above a quality threshold, and to determine what information is useful. This information is then used to control 206 the voice activity on contact microphone 225-2, if present. Control 206 also obtains a combination component 208 that includes signals from both acoustic microphone 225-1 and contact microphone 225-2. Fidelity analysis 202 and quality analysis 204 include assessing whether contact microphone 225-2 is effectively contacting the user such that a signal can be collected. In some instances, contact microphone 225-2 may not effectively touch the user's skin or have some mechanical disconnection therebetween. Accordingly, fidelity analysis 202 and quality analysis 204 indicate the kind of contact and intensity expected by establishing appropriate thresholds. In some embodiments, the thresholds may be volume based, frequency response based, and/or may include a comparison with acoustic microphone 225-1, using historical information, and the like. In some embodiments, fidelity analysis 202 and quality analysis 204 may include a machine learned model to determine the signal. Quality analysis 204 then determines which information is valuable and could determine that contact microphone 225-2 has energy of strong quality but only within a certain frequency range.

Control block 206 determines how information from the fidelity analysis 202 and quality analysis 204 is used to combine signals from acoustic microphone 225-1 with signals from contact microphone 225-2. Combination component 208 takes a signal from acoustic microphone 225-1, from contact microphone 225-2, or from either one of microphones 225, and applies a processing block 212, which could include filters (hardware and software), speech engines, and further audio processing. Combination component 208 then uses the information available to fuse the information together with other data streams. Combination component 208 may adjust over time, according to control block 206. In some embodiments, contact microphone 225-2 may be turned off, when the system determines there is no background noise, to save power. Then when there is background noise or other key flags (e.g., based on fidelity analysis 202 or quality analysis 204), the system can enable the contact microphone and start combination component 208. Combination component 208 would then be responsible for removing glitches and other interferences and noise.

In some embodiments, a second voice activity detection 210-2 may pick up a signal directly from contact microphone 225-2, or after this is combined with the signal from acoustic microphone 225-1 (e.g., to eliminate any ambient noise or interference) in combination component 208. In some embodiments, voice activity detection 210-2 may include a machine learning (ML) algorithm and/or a classical transducer with thresholds, to determine an audio in the signal (e.g., the user's voice).

Accordingly, embodiments as disclosed herein provide clean voice activity information (is the user talking, or making any other sound—consciously or not—and the like), and provide help in cleaning the acoustic signal prior to sending to a speech engine for further processing.

Figure 3:
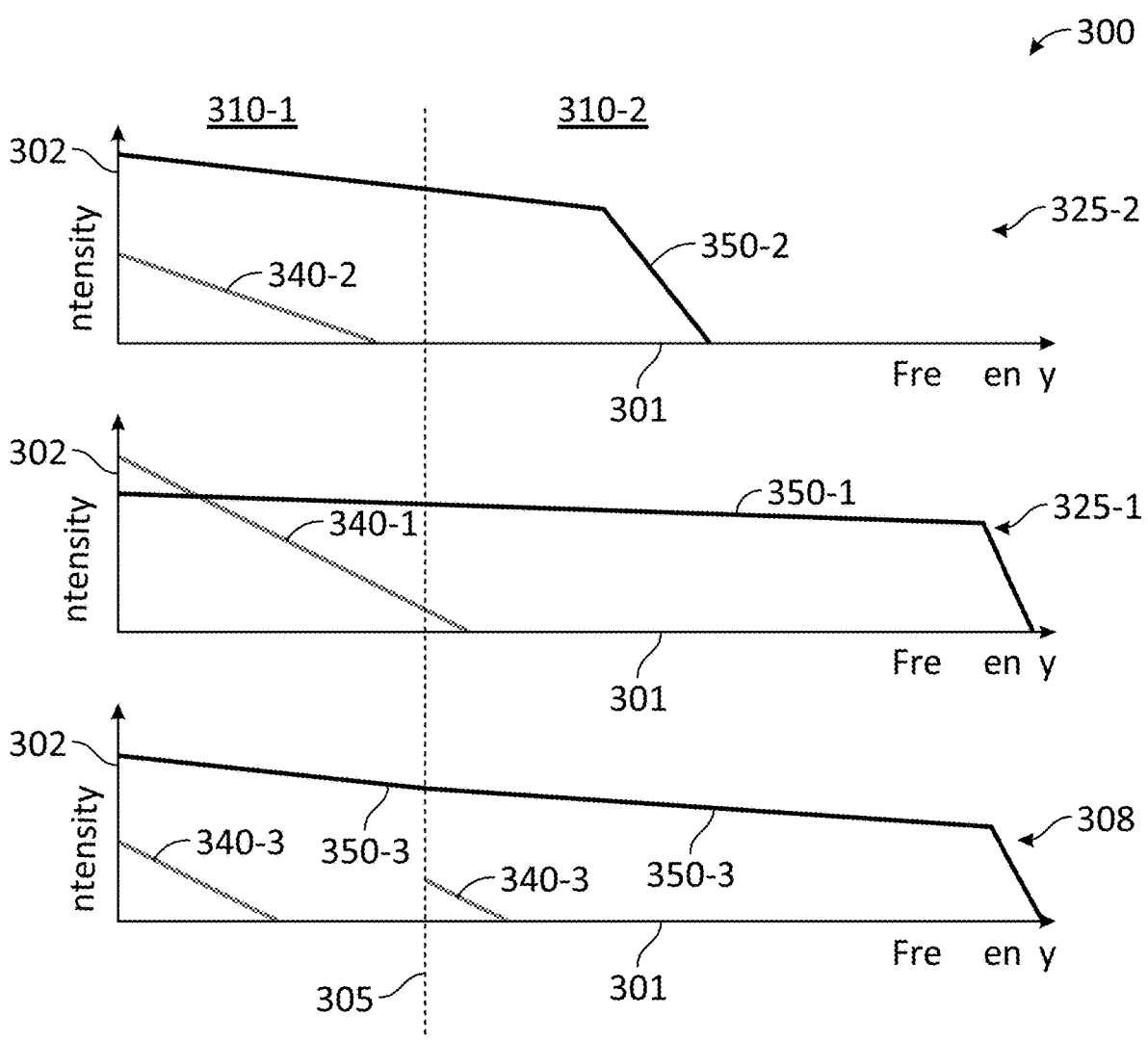
FIG. 3 illustrates spectral characteristics of audio and noise signals collected by a contact microphone, an acoustic microphone, and a combination of the two, according to some embodiments.

FIG. 3 illustrates spectral characteristics 300 of audio signals 350-1, 350-2, and 350-3 (hereinafter, collectively referred to as "audio signals 350") and noise data 340-1, 340-2, and 340-3 (hereinafter, collectively referred to as "noise 340"). Audio signals 350 and noise 340 may be collected by an acoustic microphone 325-1, a contact microphone 325-2, and a combination 308 of the two, according to some embodiments. Accordingly, in some embodiments, acoustic microphone 325-1 can be combined with contact microphone 325-2 to improve the signal-to-noise-ratio (SNR) on the output (cf. audio signal 350-3). Characteristics 300 include noise 340, signal 350, and intensity 302 (ordinates) as a function of a frequency 301 (abscissae) for acoustic microphone 325-1 and contact microphone 325-2. In some embodiments, contact microphone signal 350-2 has a low-pass filter effect of the contact microphone in region 310-2, above a pre-determined frequency cutoff 305. This is a characteristic of contact microphone 325-2 and can be learned both off-line and preloaded, or online. The combination of these may be controlled by a control block in a processor circuit included in the smart glass (e.g., control process 206, combination process 208, processor 112, and smart glass 100-1). In some embodiments, the system may combine the frequency response of acoustic microphone 325-1 and contact microphone 325-2 tailored to the spectrum of an input acoustic signal and improve the overall SNR across the entire frequency bandwidth. In some embodiments, sound signals 350 within region 310-1 (frequencies lower than frequency cutoff 305) are processed with contact microphone 325-2 and sound signals within region 310-2 (frequencies higher than frequency cutoff 305) are processed with acoustic microphone 325-1 (hereinafter, collectively referred to as "frequency regions 310"). In some embodiments, other combinations of signals 350-1 and 350-2 between acoustic microphone 325-1 and contact microphone 325-2 may be consistent with this disclosure. For example, in some embodiments, a temporal multiplexing of signals 350-1 and 350-2 may be implemented, based on the frequency content of the acoustic waves received by either microphone during a given period of time. In addition, some embodiments may allow a degree of overlap (in the frequency and/or temporal domain) between the acoustic signals 350-1 and 350-2, respectively.

For example, a combination signal 350-3 may weight signal 350-1 less than signal 350-2 in region 310-1 of the frequency spectrum. Correspondingly, signal 350-3 may weight signal 350-1 more than signal 350-2 in region 310-2 of the frequency spectrum. The result is that combination signal 350-3 has substantially less power spectral density of noise 340-3 compared to either of noise 340-1 and 340-2.

Figure 4:
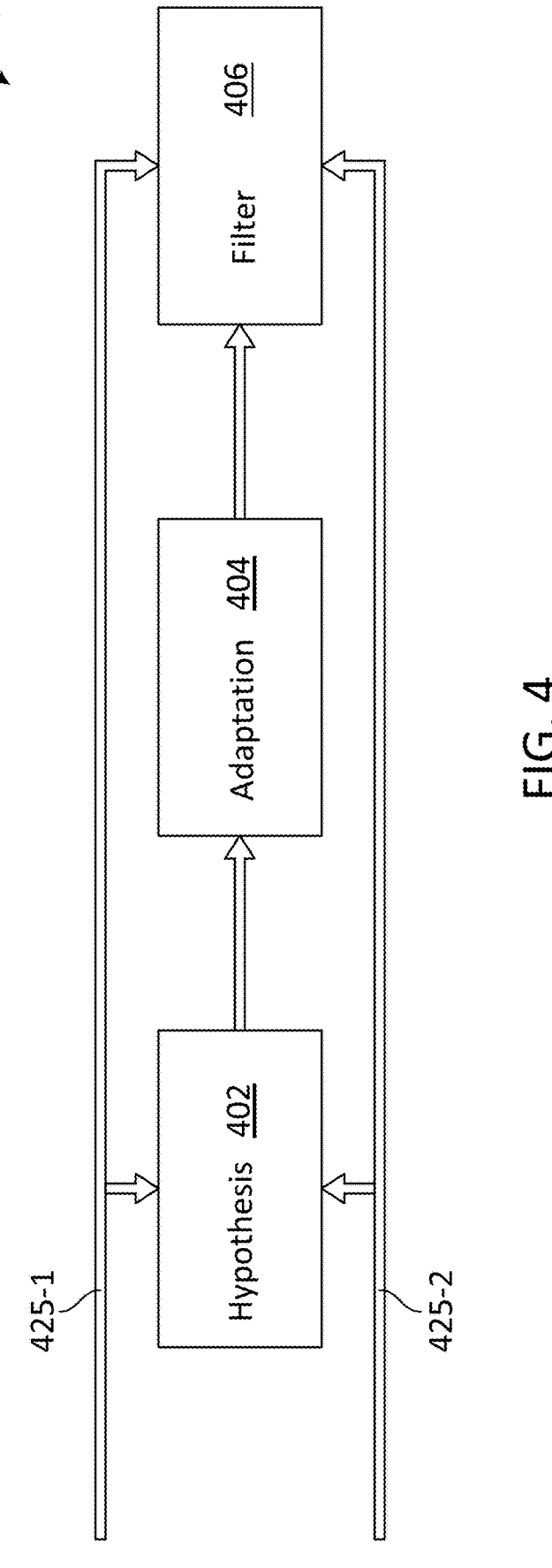
FIG. 4 illustrates a block diagram of a combined strategy for using acoustic and contact microphones to develop an adaptive filter for audio signals, according to some embodi-ments.

FIG. 4 illustrates a block diagram 400 of a combined strategy for using acoustic and contact microphones (e.g., microphones 125, 225, and 325) to develop an adaptive filter for audio signals, according to some embodiments. A hypothesis testing stage 402 receives input from an acoustic microphone 425-1 and from a contact microphone 425-2. An adaptation control stage 404 tests the hypothesis provided by stage 402, and an adaptive filter stage 406 applies a selective weighting of different components from acoustic microphone 425-1 and contact microphone 425-2 (e.g., in difference frequency domains, cf. frequency regions 310).

Figure 5:
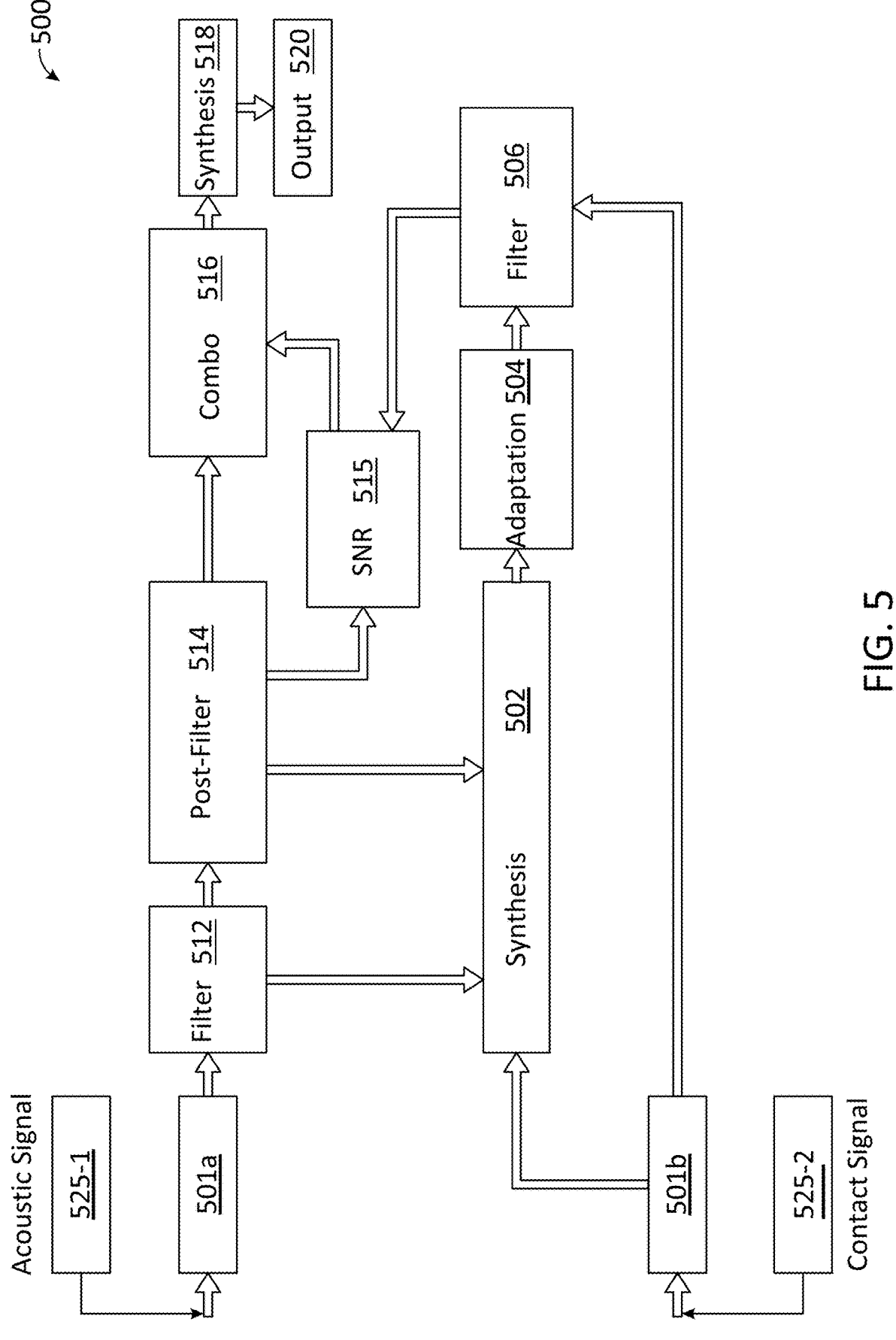
FIG. 5 illustrates a block diagram of a strategy for using acoustic and/or contact microphones to develop an adaptive filter for audio signals, according to some embodiments.

FIG. 5 illustrates a block diagram of a strategy 500 for using acoustic and/or contact microphones to develop an adaptive filter for audio signals (cf. adaptive filter stage 406), according to some embodiments. Strategy 500 integrates and synthesizes raw signals into an output signal 520 for playback and other purposes. Acoustic signal 525-1 and contact signal 525-2 (hereinafter, collectively referred to as "signals 525") are analyzed and pre-processed in steps 501*a* and 501*b*, respectively. In some embodiments, strategy 500 includes a spatial filtering stage 512 and post processing 514 integrated in a domain created by analysis 501*a* and 501*b* from raw signals 525 and synthesized for playback and other purposes. Accordingly, a dual-input (signals 525) and single-output (combined signal 520) can be extended to multi-input multi-output examples of: one or more acoustic microphones 525-1 with or without one or multi-channel beamforming or adaptive spatial filtering in stage 512. In some embodiments, one or more contact signals 525-2 may be used separately or in groups via a fusion routine, and/or one or more outputs generated from different permutations of acoustic/contact signals 525 grouped through a composition of spatial filtering 512 or sensor fusion schemes 518.

An adaptive filtering stage 506 modulates the effects of under-modeling (e.g., by favoring computational cost reductions), the accuracy of a hypothesis test in stage 502, the effective bandwidth of contact signal 525-2, the characteristics of interference, and a certain processed signal 525. In some embodiments, adaptive control stage 504 followed by adaptive filtering stage 506 can vary according to a use case (cf. adaptive control stage 404 and adaptive filtering stage 506). For example, adaptive filtering stage 506 may add more weight on output 520 for speech correction, or more weight on the main path output to limit acoustic distortions for communication. This weighting in adaptive filtering stage 506 can be done by tracking SNR levels in stage 515, and combining signals 525 in stage 516 to maximize SNR, or some other desirable other criterion (e.g., fidelity, volume, and the like).

FIG. 6 is a flowchart illustrating steps in a method for playing, in an immersive reality application, a recording of an event made with a smart glass, according to some embodiments. In some embodiments, at least one or more of the steps in method 600 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 600 may be performed by a processor executing instructions stored in a memory, wherein either the processor or the memory, or both, are part of a mobile device for the user, a remote server, or a database, communicatively coupled with each other via a network (e.g., processor 112, memory 120, mobile devices

110, server 130, and network 150). Moreover, the mobile device, the smart glass, and the wearable devices may be communicatively coupled with each other via a wireless communication system and protocol (e.g., communications module 118 including a radio, Wi-Fi, Bluetooth, near-field communication—NFC—and the like). In some embodiments, a method consistent with the present disclosure may include one or more steps from method 600 performed in any order, simultaneously, quasi-simultaneously, or overlapping in time.

Step 602 includes receiving, from a contact microphone, a first acoustic signal.

Step 604 includes determining a fidelity and a quality of the first acoustic signal. In some embodiments, step 604 includes determining that the contact microphone is mechanically coupled to a body part of the smart glass user. In some embodiments, step 604 includes identifying a voice activity from the smart glass user with the first acoustic signal when the fidelity and quality of the first acoustic signal exceeds the pre-selected threshold. In some embodiments, step 604 includes identifying a frequency cutoff based on a noise level of the contact microphone below a pre-selected threshold for frequencies higher than the frequency cutoff, wherein combining the first acoustic signal and the second acoustic signal includes using the first acoustic signal for frequencies below the frequency cutoff and using the second acoustic signal for frequencies above the frequency cutoff. In some embodiments, step 604 includes identifying a background interference in the second acoustic signal by feeding a waveform pattern including the second acoustic signal through a machine learning algorithm.

Step 606 includes receiving, from an acoustic microphone, a second acoustic signal.

When the fidelity and quality of the first acoustic signal exceeds a pre-selected threshold, step 608 includes combining the first acoustic signal and the second acoustic signal to provide an enhanced acoustic signal to a smart glass user. In some embodiments, step 608 includes wirelessly transmitting the enhanced acoustic signal to a client device, and receiving, from the client device, a text transcription of a user's speech derived from the enhanced acoustic signal. In some embodiments, step 608 includes storing the enhanced acoustic signal in a memory circuit. In some embodiments, step 608 includes identifying a background interference in the second acoustic signal based on a lack thereof in the first acoustic signal, and removing the background interference from the enhanced acoustic signal. In some embodiments, step 608 includes removing a background interference from the enhanced acoustic signal with a machine learning algorithm fed with the first acoustic signal and the second acoustic signal. In some embodiments, step 608 includes receiving a signal from an inertial motion sensor, and identifying the signal as a background interference in the first acoustic signal. In some embodiments, the first acoustic signal and the second acoustic signal are received, from a single sound source, at different times of arrival, and step 608 includes forming, a beam of sound in a direction of the single sound source relative to the augmented reality headset. In some embodiments, step 608 includes selecting a bandwidth of the first acoustic signal and the second acoustic signal to improve a signal to noise ratio of the enhanced acoustic signal. In some embodiments, step 608 includes permuting multiple acoustic signals with selected weighting factors to improve the fidelity and quality of the enhanced acoustic signal relative to the first acoustic signal. In some embodiments, step 608 includes spatially filtering the first acoustic signal and the second acoustic signal to form the enhanced acoustic signal in a beam along a selected direction. In some embodiments, step 608 includes iteratively modifying the enhanced acoustic signal to obtain a preselected quality.

Hardware Overview

Figure 7:
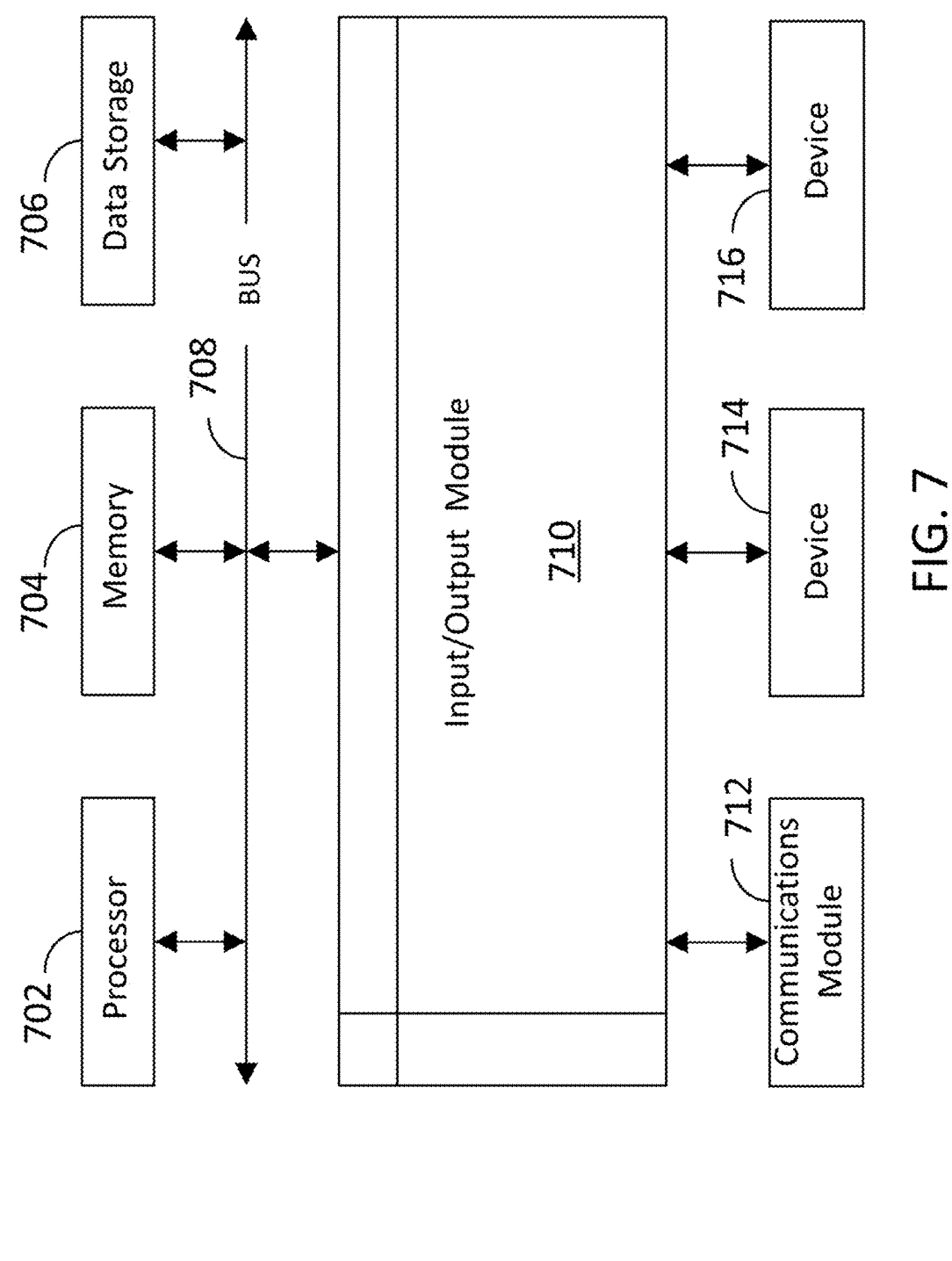
FIG. 7 is a block diagram illustrating a computer system for implementing a headset and methods for use thereof, according to some embodiments.

FIG. 7 is a block diagram illustrating a computer system for implementing a headset and methods for use thereof, according to some embodiments. In certain aspects, computer system 700 may be implemented using hardware or a combination of software and hardware, either in a dedicated server, or integrated into another entity, or distributed across multiple entities. Computer system 700 may include a desktop computer, a laptop computer, a tablet, a phablet, a smartphone, a feature phone, a server computer, or otherwise. A server computer may be located remotely in a data center or be stored locally.

Computer system 700 includes a bus 708 or other communication mechanism for communicating information, and a processor 702 (e.g., processor 112) coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, e.g., one or more modules of computer program instructions encoded on a computer-readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled with bus 708 for storing information and instructions. Computer system 700 may be coupled via input/output module 710 to various devices. Input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, input/output module 710 is configured to connect to a plurality of devices, such as an input device 714 and/or an output device 716. Exemplary input devices 714 include a keyboard and a pointing device, e.g., a mouse or a trackball, by which a consumer can provide input to the computer system 700. Other kinds of input devices 714 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 716 include display devices, such as an LCD (liquid crystal display) monitor, for displaying information to the consumer.

According to one aspect of the present disclosure, smart glass 100-1 can be implemented, at least partially, using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires forming bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
  receiving, from a first microphone of a client device, a first acoustic signal;

receiving, from a second microphone of the client device, a second acoustic signal;
  determining whether the first acoustic signal exceeds a preselected threshold; and
  based on determining the first acoustic signal exceeds the preselected threshold, combining the first acoustic signal and the second acoustic signals to generate a third acoustic signal, wherein combining the first acoustic signal and the second acoustic signal comprises permuting the first acoustic signal and the second acoustic signal with weighting factors selected to improve a quality of the third acoustic signal relative to a quality of the first acoustic signal.

2. The computer-implemented method of claim 1, wherein:
  the first microphone comprises a contact microphone;
  the second microphone comprises an acoustic microphone; and
  the client device comprises a headset.

3. The computer-implemented method of claim 1, further comprising:
  wirelessly transmitting the third acoustic signal to the client device; and
  receiving, from the client device, a text transcription of a speech of a user derived from the third acoustic signal.

4. The computer-implemented method of claim 1, further comprising
  determining the first microphone is mechanically coupled to a body part of a user of the client device.

5. The computer-implemented method of claim 1, further comprising
  identifying a voice activity from a user of the client device with the first acoustic signal when the quality of the first acoustic signal exceeds the preselected threshold.

6. The computer-implemented method of claim 1, further comprising
  identifying a frequency cutoff based on a noise level of the first microphone below a preselected threshold for frequencies higher than the frequency cutoff, wherein combining the first acoustic signal and the second acoustic signal comprises using the first acoustic signal for frequencies below the frequency cutoff and using the second acoustic signal for frequencies above the frequency cutoff.

7. The computer-implemented method of claim 1, wherein
  combining the first acoustic signal and the second acoustic signal comprises:
  identifying a background interference in the second acoustic signal based on a lack thereof in the first acoustic signal; and
  removing the background interference from the third acoustic signal.

8. The computer-implemented method of claim 1, wherein
  providing the third acoustic signal comprises removing a background interference from the third acoustic signal with a machine learning algorithm fed with the first acoustic signal and the second acoustic signal.

9. The computer-implemented method of claim 1, further comprising
  identifying a background interference in the second acoustic signal by feeding a waveform pattern including the second acoustic signal through a machine learning algorithm.

10. The computer-implemented method of claim 1, further comprising:

receiving a signal from an inertial motion sensor; and identifying the signal as a background interference in the first acoustic signal.

11. The computer-implemented method of claim 1, wherein:

the first acoustic signal and the second acoustic signal are received from a single sound source and at different times of arrival; and combining the first acoustic signal and the second acoustic signal comprises forming a beam of sound in a direction of the single sound source relative to the client device.

12. The computer-implemented method of claim 1, wherein combining the first acoustic signal and the second acoustic signal comprises selecting a bandwidth of the first acoustic signal and the second acoustic signal to improve a signal-to-noise ratio of the third acoustic signal.

13. The computer-implemented method of claim 1, wherein combining the first acoustic signal and the second acoustic signal comprises permuting the first acoustic signal and the second acoustic signal with weighting factors selected to improve a fidelity of the third acoustic signal relative to a fidelity of the first acoustic signal.

14. The computer-implemented method of claim 1, wherein combining the first acoustic signal and the second acoustic signal comprises spatially filtering the first acoustic signal and the second acoustic signal to form the third acoustic signal in a beam along a selected direction.

15. A system, comprising:

one or more processors; and a memory storing instructions that, when executed by the one or more processors, cause the system to perform a method including:

receiving, from a first microphone of a client device, a first acoustic signal;

receiving, from a second microphone of the client device, a second acoustic signal;

determining whether the first acoustic signal exceeds a preselected threshold; and based on determining the first acoustic signal exceeds the preselected threshold, combining the first acoustic signal and the second acoustic signals to generate a third acoustic signal, wherein combining the first acoustic signal and the second acoustic signal comprises permuting the first acoustic signal and the second acoustic signal with weighting factors selected to improve a quality of the third acoustic signal relative to a quality of the first acoustic signal.

16. The system of claim 15, wherein the method further includes feeding a waveform pattern including the second acoustic signal through a machine learning algorithm to identify a background interference in the second acoustic signal.

17. The system of claim 15, wherein the method further includes:

receiving a signal from an inertial motion sensor; and identifying the signal as a background interference in the first acoustic signal.

18. The system of claim 15, wherein the method further includes removing a background interference from the third acoustic signal with a machine learning algorithm fed with the first acoustic signal and the second acoustic signal.

19. The system of claim 15, wherein the method further includes:

identifying a background interference in the second acoustic signal based on a lack thereof in the first acoustic signal; and removing the background interference from the third acoustic signal.

20. A non-transitory, computer-readable storage medium storing instructions encoded thereon that, when executed by a processor, cause the processor to perform a method comprising:

receiving, from a contact microphone of an augmented reality headset, a first acoustic signal;

receiving, from an acoustic microphone of the augmented reality headset, a second acoustic signal;

determining whether the first acoustic signal exceeds a preselected threshold; and based on determining the first acoustic signal exceeds the preselected threshold, combining the first acoustic signal and the second acoustic signals to generate a third acoustic signal, wherein combining the first acoustic signal and the second acoustic signal comprises permuting the first acoustic signal and the second acoustic signal with weighting factors selected to improve a fidelity and a quality of the third acoustic signal relative to a fidelity and a quality of the first acoustic signal.

* * * * *